United States Patent Office 2,779,863
Patented Jan. 29, 1957

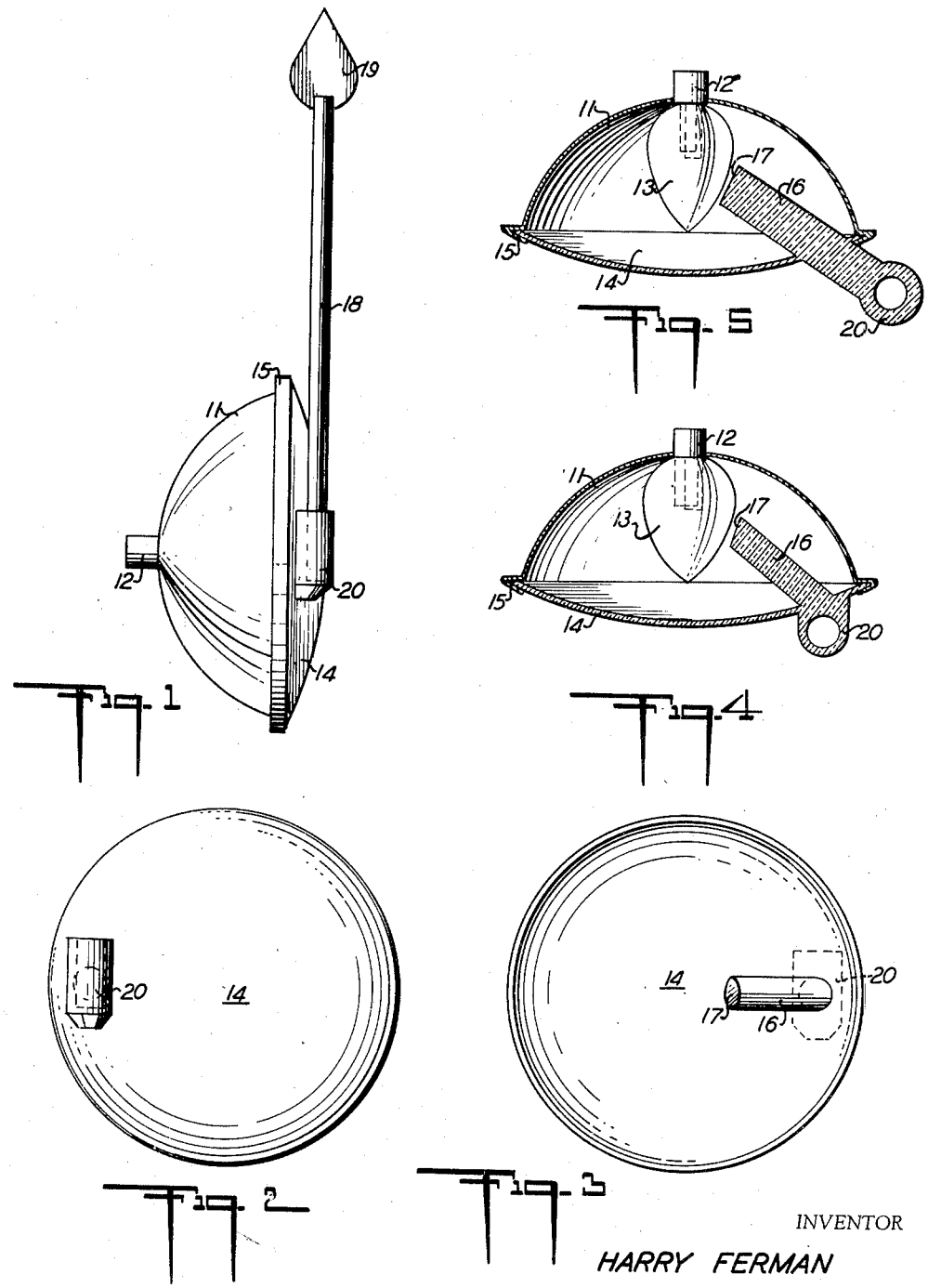

2,779,863
MOTOR VEHICLE GUIDE

Harry Ferman, Newark, N. J.

Application April 21, 1952, Serial No. 283,384

3 Claims. (Cl. 240—7.1)

This invention relates generally to motor vehicle indicators, and more specifically to indicators mounted adjacent the headlamps of a motor vehicle, preferably on the headlamp rim or on the headlamp lens.

This application is a continuation-in-part of my prior application, Serial Number 265,275, filed January 7, 1952, for Motor Vehicle Indicator, which in turn is a continuation-in-part of application Serial Number 247,634, now abandoned, filed September 21, 1951, for Motor Vehicle Indicator.

In my prior application, Serial Number 247,634, now abandoned, filed September 21, 1952, I have disclosed motor vehicle indicators which are adapted to be positioned adjacent the extreme front portions of a modern motor vehicle body, namely, the motor vehicle headlamp. In Serial Number 265,275, filed January 7, 1952, I have disclosed further modifications of motor vehicle indicators adapted to be positioned adjacent to vehicle headlamps.

It is an object of my invention to provide an indicator which will enable the driver of a motor vehicle to accurately ascertain the position of the front and sides of the vehicle, particularly the extreme end portion of the front fenders.

Another object of my invention is to provide an illuminated motor vehicle indicator which will be readily visible in darkness.

A further object of my invention is to provide a pair of illuminated motor vehicle indicators which will permit the driver of an approaching vehicle to determine the width of a vehicle equipped with such indicator means at the extreme outer front portions thereof.

A further object is to provide a motor vehicle indicator which is integral with the motor vehicle headlamp lens.

Still another object of my invention is to provide a motor vehicle indicator which is removably secured to the headlamp, preventing theft or damage to the indicator.

Further objects of my invention will be readily understood by reference to the following description and accompanying drawings.

I accomplish the objects of my invention generally by providing a motor vehicle indicator comprising a support adapted to be mounted adjacent the motor vehicle headlamp, a vertically extending indicator rod carried by such support, and illuminating means for illuminating the top portion of said indicator rod.

More specifically, one form of my invention comprises a lens of light-transmitting material adapted to be positioned forwardly of a motor vehicle headlamp, a socket of light-transmitting material carried by said lens, and adapted to receive an indicator rod of light-transmitting material in a vertical position.

Another embodiment comprises such a motor vehicle indicator wherein said socket of light-transmitting material is made integral with said lens. Additionally, the motor vehicle indicator in my invention comprises such an indicator wherein said lens has a rod of light-transmitting material carried on the rear side thereof and adapted to be positioned adjacent the electric lamp and wherein said socket of light-transmitting material is positioned on the outer surface of said lens opposite said rod of light-transmitting material.

In the drawings:

Figure 1 is a side view of one form on my invention showing a motor vehicle headlamp having an indicator socket carried by the headlamp lens, with a vertical indicator rod positioned therein;

Figure 2 is a front view of the headlamp lens shown in Figure 1, with the indicator rod removed therefrom;

Figure 3 is a back view of the headlamp lens shown in Figures 1 and 2 with the vertical indicator rod removed therefrom.

Figure 4 is a cross-sectional view of the indicator assembly of Figures 1–3 with the indicator rod removed.

Figure 5 is a cross-sectional view of another form of indicator of the type shown in Figures 1–4.

In Figures 1–5, a motor vehicle headlamp shell is shown at 11, which is preferably of the sealed-beam type and is adapted to be mounted in the fender well of a motor vehicle (not shown). The headlamp shell carries an electrical socket 12 in which is positioned an electric lamp 13, as shown. The headlamp assembly may also be of the sealed-beam type which does not include a separate lamp bulb 13, but instead has a bare filament exposed within the shell 11. The headlamp lens of glass or other light-transmitting material is shown at 14 and is suitably sealed to the headlamp shell 11, as by rim 15. The lens 14 carries a socket 20 of glass or other light-transmitting material which is preferably made integral with the lens 14. As shown in Figures 3, 4 and 5, the lens 14 also preferably carries a rod 16 which extends within the headlamp assembly and has an end 17 positioned adjacent the lamp 13. The socket 20 is adapted to receive a vertical indicator rod 18 of light-transmitting material, preferably Lucite, a methyl methacrylate resin, or the like. The indicator rod 18 may be made integral with socket 20, but is preferably removably positioned therein. The rod 18 preferably carries an ornamental tip 19.

In operation, light from the lamp 13 is transmitted through the socket 20 and up through vertical rod 18 of light-transmitting material. Preferably, it is desirable to increase the illumination of rod 18 by the structure shown in Figures 4 and 5, wherein the light is transmitted from the bulb 13 through the rod 16 and thence up through indicator rod 18. In the modification shown in Figure 4, the socket 20 is positioned in the path of the light from lamp 13. In the modification shown in Figure 5, the socket 20 is positioned outside of the direct path of the light from lamp 13. In this latter modification, the socket 20 does not obstruct the beam of light from the headlamp.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. A lens for motor vehicle headlamps comprising a lens of light-transmitting material, a first rod of light-transmitting material carried by said lens, said rod having a first end portion extending outwardly from one face of said lens and a second end portion extending outwardly from the other face of said lens, and a socket of light-transmitting material carried by said second end portion of said rod, said socket adapted to receive an indicator rod of light-transmitting material in a vertical position.

2. A lens set forth in claim 1 wherein said first rod and said socket are integral with said lens.

3. A motor vehicle indicator comprising a light-transmitting lens adapted to be positioned forwardly of a motor vehicle headlamp, a first rod of light-transmitting material carried by said lens, said rod having a first end portion extending outwardly from one face of said lens and a second end portion extending outwardly from the other face of said lens, a socket of light-transmitting material carried by said second end portion of said rod and a vertically extending indicator rod of light-transmitting material positioned in said socket.

References Cited in the file of this patent

UNITED STATES PATENTS

| | | |
|---|---|---|
| 1,447,902 | Sell | Mar. 6, 1923 |
| 1,490,415 | Carr | Apr. 15, 1924 |
| 1,538,177 | Deery | May 19, 1925 |
| 2,481,321 | Marcinik | Sept. 6, 1949 |